PHASE DETECTOR AND AUTOMATIC APPARATUS UTILIZING SAID PHASE DETECTOR FOR PERFORMING A ROTATIONAL MECHANICAL ADJUSTMENT TO EFFECT A PHASE COINCIDENCE

Filed Dec. 13, 1962

INVENTOR.
EARL R. KREINBERG
BY
Robert D. Sanborn
ATTORNEY

SINGLE OUTPUT MULTIVIBRATOR EMBODIMENT

SIGNAL GENERATOR ADJUSTING EMBODIMENT

BRIDGE CIRCUIT ADJUSTING EMBODIMENT

INVENTOR.
EARL R. KREINBERG
BY
Robert D. Santon
ATTORNEY

United States Patent Office 3,271,675

Patented Sept. 6, 1966

3,271,675

PHASE DETECTOR AND AUTOMATIC APPARATUS UTILIZING SAID PHASE DETECTOR FOR PERFORMING A ROTATIONAL MECHANICAL ADJUSTMENT TO EFFECT A PHASE COINCIDENCE

Earl R. Kreinberg, Harrisburg, Pa., assignor to Philco Corporation, Philadelphia, Pa., a corporation of Delaware Filed Dec. 13, 1962, Ser. No. 244,416
13 Claims. (Cl. 324—83)

Figure 1:
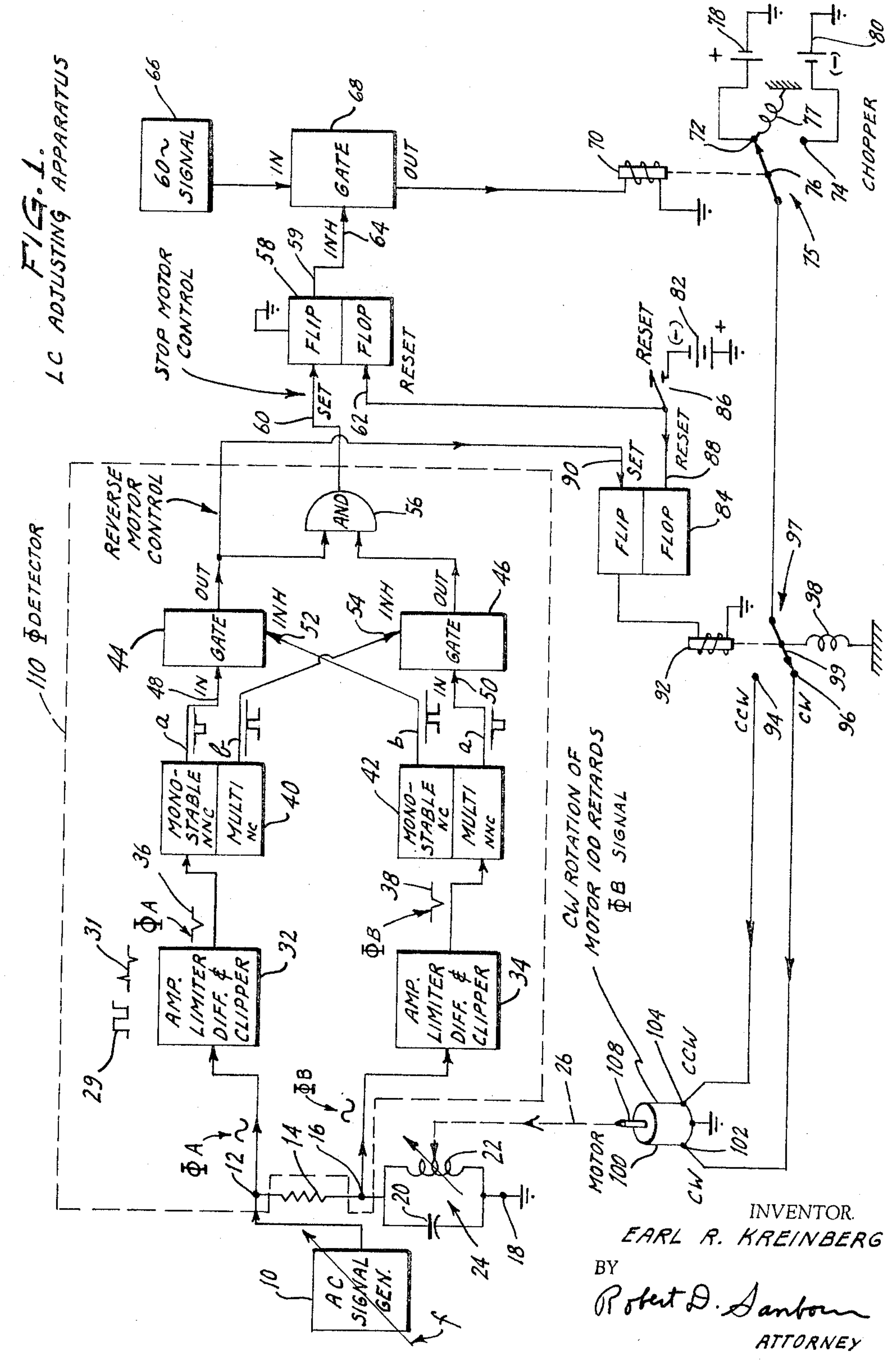

This invention relates to a phase detector, and more particularly, to automatic adjusting apparatus utilizing a phase detector.

The invention comprises, in its broadest aspect, a system for detecting the phase coincidence of two signals. In another aspect it comprises frequency-adjusting apparatus for automatically adjusting a signal generator until the frequency of its output signal equals a predetermined value. In a further aspect the invention comprises apparatus for adjusting an impedance until a certain condition is attained. The impedence may be a capacitor or inductor which forms part of a tuned circuit, in which case the condition to be attained is resonance. The impedance may form part of a bridge circuit, in which case a current balance in the bridge is the condition sought. The "impedance" is not limited to conventional types; the apparatus may also be used to adjust the volume of a cavity resonator or the length of a transmission line. The invention is, in fact, suitable for all applications wherein a rotational mechanical adjustment, which may be reversible, can be used to bring about the phase coincidence of two signals.

The invention, when used as impedance adjusting apparatus, finds particular application in production facilities where repetitive adjustments may be required. Utilization of the present apparatus effects a more rapid and accurate adjustment, in addition to eliminating human errors.

OBJECTS

Accordingly the objects of the present invention are:

(1) to provide a new and improved phase coincidence detector (2) to provide novel and improved impedance adjusting and turning apparatus, and (3) to provide novel and improved frequency adjusting apparatus.

Other objects and advantages of the invention will become apparent from a consideration of the ensuing summary, description, and accompanying drawings.

SUMMARY

The preferred embodiment of the present invention constitutes a system for automatically adjusting a tuned circuit until its resonant frequency equals the frequency of an alternating signal. Said alternating signal is applied across the tuned circuit, whereby it undergoes a phase shift when the circuit is detuned from the frequency of the A.C. signal. Respective pulse trains are derived from the original and phase shifted versions of the alternating signal in separate channels. The first occurring pulse, representative of the signal of leading phase, inhibits conduction in the other channel. When the turned circuit, which is being continually adjusted in a predetermined direction by a reversible adjusting motor, is tuned to the frequency of the applied signal, the two pulse trains will be in phase, so that conduction in both channels will be inhibited—but only after the pulses in both channels have passed to a two-input coincidence gate in which the channels are terminated. The output signal from the coincidence gate will halt further adjustment of the tuned circuit. If the turned circuit is being initially adjusted away the frequency of the applied signal a preselected one of the two channels will carry the first-occurring pulse—which will be used to reverse the adjusting motor.

DRAWING

Figure 2:
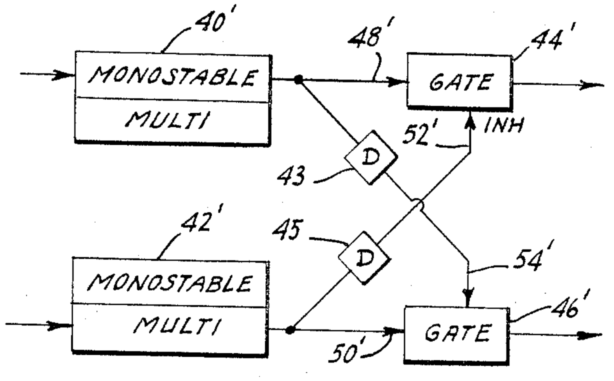
Figure 3:
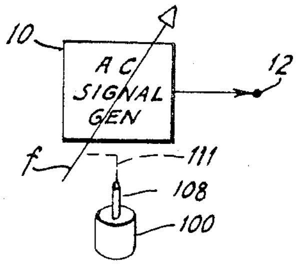
Figure 4:
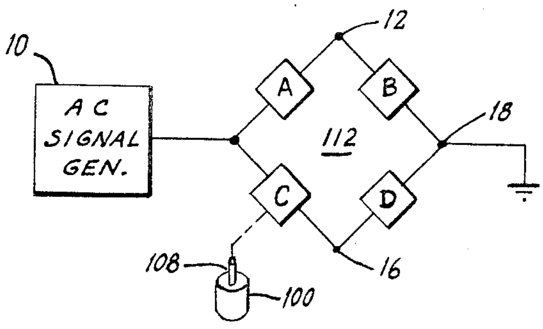

FIG. 1 of the drawing is a block diagram of one preferred form of the invention for adjusting an LC circuit;

FIG. 2 is a partial block diagram of a modification of the phase discriminator included in FIG. 1, FIG. 3 is a partial block diagram of an embodiment of the invention for adjusting a signal generator; and FIG. 4 is a partial block diagram of an embodiment of the invention for adjusting a bridge circuit.

FIG. 1

*Structure*

Referring to FIG. 1 of the drawing, it is seen that an A.C. signal generator 10, whose output frequency may be adjustable, is connected at point 12 to one terminal of resistor 14. The other terminal of resistor 14 is connected to point 16. Plug in terminals may be provided at points 16 and 18 into which production units such as LC circuit 24 may be inserted for automatic tuning. LC circuit 24 may be tuned by adjusting the reactance of capacitor 20 or inductor 22. For exemplary purposes it will be assumed that it is inductively tuned, and that the tuning element of inductor 22 represented by broken line 26 is connected to shaft 108 on adjusting motor 100 as shown. Motor 100 may be manually held with shaft 108 coupled to an adjusting screw on inductor 22. As an alternative, motor 100 may be mechanically supported with shaft 108 arranged to automatically engage an adjusting screw on circuit 24 when it is plugged into terminals 16–18. In lieu of LC circuit 24 may be used any other type of adjustable impedance, as aforenoted. The signals which appear on terminals 12 and 16, respectively designated $\phi$A and $\phi$B, the supplied to units 32 and 34, whose functions are to amplify, limit, differentiate, and clip applied signals.

The output pulses 36 and 38 from these units are fed to respective monostable multivibrators 40 and 42 which may be provided with means for adjusting their output pulse width. Each multivibrator has two outputs, designated by the legends "*a*" and "*b*," respectively. As is well known, each multivibrator may be composed of two cross-coupled inverting elements such as transistors, one of which is normally conducting (NC) and one which is normally nonconducting (NNC). Hence one side (*a*) of the multivibrator will normally provide a high (ground) voltaic output, while the other side (*b*) thereof will normally provide a low (negative) output. When the multivibrator is triggered to its quasi-stable state, the voltages on the two outputs will temporarily reverse, as indicated by the pulses adjacent the "*a*" and "*b*" output lines of multivibrator 40 and 42. The "*a*" output lines of multivibrator 40 and 42 are coupled to the inputs 48 and 50 of the gates 44 and 46, respectively, while the "*b*" output lines are cross-coupled to the inhibit inputs 52 and 54 of gates 44 and 46, respectively.

Gates 44 and 46 are normally transmissive of any negative signal applied to their "IN" inputs, 48 and 50, but can be rendered non-transmissive when a signal is supplied to their "INHIBIT" (INH) inputs 52 or 54 from the "*b*" outputs of multivibrators 40 and 42.

The outputs of gates 44 and 46 are coupled to the two inputs of AND gate 56, the output of which is coupled to SET input 60 of flip-flop 58. The output 59 of flip-flop 58 is coupled to the inhibit input 64 of gate 68. Gate 68 is supplied with an A.C. signal from source 66. The output of gate 68 is fed to the reed actuating coil 70 of chopper 75.

Coil 70 is a part of chopper 75 which also included contacts 72 and 74, and reed 76. Contacts 72 and 74 are connected respectively to batteries 78 and 80. Reed 76 is returned to a center position by spring 77 when coil 70 is not energized. The output of chopper 75 is fed to single-pole-double-throw relay 97, which will be discussed shortly.

Returning first to gate 44, it is seen that the output thereof is also connected to SET input 90 of flip-flop 84. (The RESET input 88 of flip-flop 84, as well as RESET input 62 of flip-flop 58, are connected to battery 82 via normally open reset switch 86.) The output of flip-flop 84 is connected to relay 92, which includes single-pole-double-throw switch 97. Arm 99 of switch 97 is normally connected to point 96 due to spring 98 urging it in that position, so that the output of chopper 75 is normally connected to clockwise (CW) point 96 and hence to control terminal 102 of motor 100. When flip-flop 84 is SET, relay 92 will be energized, pulling arm 99 to counterclockwise (CCW) point 94 so that the output of chopper 75 is connected to control terminal 104 of motor 100. Motor 100 may be any reversible control motor which will rotate clockwise if an alternating current is applied to its terminal 102 and which will rotate counterclockwise if an alternating current is applied to terminal 104.

OPERATION

*(1) Phase coincidence detector*

The apparatus within dotted line 110 of FIG. 1 of the drawing constitutes a novel phase coincidence detector which will yield an output when its two input signals are in phasal coincidence, and which also provides a reversing output for the adjusting motor 100 when used as part of the impedance or frequency adjusting embodiment of the invention. Said detector includes elements 12, 16, 32, 34, 40, 42, 44, 46, and 56 only, and for this discussion the remaining elements in the drawing outside the dotted line 110 may be disregarded.

Two A.C. input signals to be compared in phase are applied at points 12 and 16, respectively. These signals preferably have a sinusoidal shape as shown, but any other repetitive A.C. signal waveform (such as a square or sawtooth wave) may also be compared. The signal 28 applied to terminal 12 may arbitrarily be designated "$\phi$A" and the signal 30 applied to terminal 16 may be designated "$\phi$B."

In units 32 and 34 each signal is amplified and limited until it assumes a square-wave form similar to wave 29. The signals are then differentiated to obtain positive and negative pulsed waveforms similar to wave 31 in well-known manner from each cycle of the square wave. The signals are then clipped to leave only negative pulses (similar to waveforms 36 and 38) which occur each time the original sine waves 28 and 30 cross the zero axis with negative slope.

The negative pulses 36 and 38 are fed to monostable multivibrators 40 and 42 where they are stretched or lengthened in well-known fashion. The multivibrators should be chosen or adjusted so that the temporal width of their output pulses is less than 1 period of the input signals.

The stretched negative going pulses at the "*a*" outputs of the multivibrators are fed to inputs 48 and 50 of normally transmissive gates 44 and 46, while the stretched positive going pulses from the "*b*" outputs of the multivibrators are cross-coupled to inhibit inputs 52 and 54 of gates 44 and 46. The input signal which has the leading phase will pass through its associated channel and inhibit conduction in the other channel. If, for example, $\phi$A leads $\phi$B as shown, pulse 36 will trigger multivibrator 40 before pulse 38 can trigger multivibrator 42. A negative going pulse as shown will immediately appear at the "*a*" output of multivibrator 40, while due to inherent cross coupling delay within multivibrator 40, a positive going pulse will appear at the "*b*" output of multivibrator 40 a very short interval thereafter. The negative pulse from the "*a*" output will pass through normally transmissive gate 44 and energize one input of AND gate 56 and also trigger SET input 90 of flip-flop 84. The positive going pulse from the "*b*" output will trigger inhibit input 54 of gate 46 and thus prevent the negative going pulse from the "*a*" output lead of multivibrator 42 from passing through gate 46. The positive going pulse from the "*b*" output of multivibrator 42 will trigger inhibit input 52 of gate 44 and terminate further transmission therethrough. Thus AND gate 56 will receive only one input (from gate 44) if the $\phi$A signal leads. If the $\phi$B signal should lead, AND gate 56 will receive only one input from gate 46 by a similar analysis. Hence as long as a phase difference exists, pulses will be continuously supplied from gate 44 or gate 46, but not both. The gate (44 or 46) which supplies output pulses is indicative of which signal, $\phi$A or $\phi$B, is leading.

If the $\phi$A signal is in phase with the $\phi$B signal, both multivibrators 40 and 52, will be triggered simultaneously. Since the positive going inhibitory pulses from the "*b*" outputs of the multi's occur shortly *after* the negative going pulses from the "*a*" outputs, both gates, 44 and 46, will receive pulses at their inputs 48 and 50 before they are inhibited by the cross coupled "*b*" pulses. Hence AND gate 56 will provide an output, indicating a detection of phase coincidence. AND gate 56 will thus provide output pulses as long as a phase coincidence exists between signals 28 and 30.

*FIG. 2—Single output multivibrators*

Reference is made to FIG. 2, wherein is shown monostable multivibrators 40′ and 42′ which of the type that have only a single output lead (e.g., tunnel diode multivibrators). Here the cross coupling inhibitory pulses may be obtained by connecting the single output leads to short delayers 43 and 45, and thence to the cross coupled inhibitory inputs 52′ and 54′ of gates 44′ and 46′. In this case the polarity of the cross coupled inhibit pulses will be the same as the pulses to inputs 48′ and 50′ of gates 44′ and 46′. Suitable inhibitory gates, which operate with like-polarity control and gated pulses, are readily obtainable and may easily be used in lieu of gates 44 and 46 of FIG. 1. An inverter may be used in each cross coupling path if the opposite-polarity inhibit gates 44 and 46 of FIG. 1 are retained. In this latter case enough inherent delay will exist in the inverters so that delayers 43 and 45 may be omitted.

*(2) Automatic tuning of LC circuit*

When the phase detector just described is used in conjunction with the other elements shown in FIG. 1 outside line 110, impedance adjusting apparatus is provided which will automatically adjust the value of an impedance to a desired condition. According to the preferred embodiment of the invention said impedance is a parallel LC circuit 24, and the apparatus shown will tune the LC circuit to the frequency of the signal supplied by generator 10.

As is well known to those skilled in the art, a signal will undergo a phase shift if it is applied across a circuit having a resonant frequency different from its own frequency. Thus when the resonant frequency of LC circuit 24 is different from the frequency of the output signal from generator 10, a phase shifted version (arbitrarily designated $\phi$A) of the signal from generator 10 will appear at point 16. A non-phase-shifted version $\phi$B of the signal from generator 10 will appear at point 12. According to the invention motor 100 is continually changing the resonant frequency of LC circuit 24 in order to bring signal $\phi$B into phase coincidence with signal $\phi$A. When such phase coincidence occurs, phase detector 110 will provide an output to stop adjusting motor 100. If motor 100 is initially adjusting LC circuit 100 is the wrong direction, i.e., away from resonance, phase detector 110 will provide a signal to reverse its direction of rotation. The stop motor control and reverse motor control circuits will now be separately discussed in detail.

*Stop motor control.*—Assume that motor 100 is adjusting LC circuit 24 toward resonance. This adjustment may be effected by turning a slug on inductor 22 as indicated, or by adjusting capacitor 20. When resonance is attained, phase coincidence will exist and AND gate 56 will provide an output to SET flip-flop 58.

The 60 cycle signal from source 66 has been passing through normally transmissive gate 68 to energize coil 70 of chopper 75 and thereby cause reed 76 to alternately contact points 72 and 74. This sends an alternating current through arm 99 to point 96 to rotate motor 100 in the clockwise direction. When flip-flop 58 is SET due to the appearance of an output from AND gate 56, it will provide an output to inhibit input 64 of gate 68 and thereby de-energize coil 70. Reed 76 will come to rest between contacts 72 and 74 due to the bias of spring 77, and motor 100 will stop adjustment of LC circuit 24, which is now tuned to the frequency of the signal from generator 10. After a tuning operation, flip-flop 58 is reset manually by momentarily closing switch 86 so that a negative voltage from battery 82 will be applied to RESET input 62 of flip-flop 58.

*Reverse motor control.*—Flip-flop 84 is always initially in the RESET state since its RESET input 88 is also connected to switch 86. When flip-flop 84 is reset, no energy will be supplied to relay 92 and hence spring 98 will pull arm 99 of switch 97 to the clockwise position at contact 96. Thus motor 100 will always initially rotate clockwise. Motor 100 and LC circuit 24 must be arranged so that clockwise rotation will increase the resonant frequency of LC circuit 24 and thus retard the phase of the signal $\phi$B. Thus if the signal $\phi$B leads the signal $\phi$A (due to circuit 24 being tuned below resonance) motor 100 will continue rotating clockwise to increase the resonant frequency of LC circuit 24 until the signal $\phi$B is retarded enough to be in phase with the signal $\phi$A. However, if the signal $\phi$A leads the signal $\phi$B (due to circuit 24 being tuned above resonance), gate 44 will provide an output and gate 46 will be inhibited. The output of gate 44 will SET flip-flop 84 and relay 92 will receive energy to shift the position of arm 99 to counterclockwise contact 94. Motor 100 will be caused to rotate counterclockwise and thus decrease the frequency of LC circuit 24 until the signal $\phi$B is advanced to phase coincidence with the signal $\phi$A.

*FIG. 3—Frequency adjustment of signal generator*

The apparatus of invention may also be used to automatically adjust the frequency of an oscillator to a desired value. In this case LC circuit 24, or a tuned crystal, may represent the standard and generator 10 will represent the unit to be automatically adjusted. Shaft 108 of motor 100 is connected to a rotational tuning mechanism in generator 10, as indicated by reference numeral 111 in FIG. 3, rather than to LC circuit 24 (as indicated by reference numeral 26 in FIG. 1). When the apparatus is turned on, or when generator 10 is connected to point 12, motor 100 will commence changing the frequency of the signal from generator 10. The generator or the mechanical linkage from the motor to the generator should be arranged so that clockwise rotation of the motor will cause the signal $\phi$B produced at point 16 to be retarded. If the initial output frequency of the generator is such that the signal $\phi$B leads, motor 100 will correct said frequency until a phase (and frequency) coincidence exists. If the initial output frequency of generator 10 is such as to render the signal $\phi$A leading, motor 100 will be automatically reversed for counterclockwise rotation so that generator 10 will be adjusted in the correct direction.

*FIG. 4—Bridge circuit adjustments*

It will be apparent from the foregoing that the apparatus of the invention may be used wherever a mechanical adjustment of an impedance can be used to bring about a phase coincidence of two signals. Bridge circuits are particularly suited for automatic adjustments according to the invention.

Referring to FIG. 4, there is shown a bridge circuit 112 having arms A, B, C, and D connected in a ring as indicated. Circuit 112 is connected to the FIG. 1 arrangement after resistor 14 and LC circuit 24 are removed therefrom. The junction of arms A and C is connected to generator 10, the junction of arms A and B to point 12, the junction of arms C and D to point 16, and the junction of arms B and D to ground i.e. point 18. Shaft 108 of motor 100 is connected to a mechanical adjusting point on arm C or arm D, as will be explained.

A variable capacitor, for example, can be automatically adjusted so that its capacitance will equal that of a fixed or reference capacitor by inserting the reference capacitor in arm A of bridge 112, inserting equal resistors in arms B and D thereof, inserting the variable capacitor in arm C, and connecting shaft 108 of motor 100 to the adjusting shaft of the variable capacitor. When the motor 100 automatically terminates its adjusting operation, the phases of the signals at points 12 and 16 will be equal, and the capacitance of the variable capacitor will be equal to that of the standard capacitor, as is well known to those skilled in the art. A reference inductor and a variable inductor can alternatively be used in arms A and C instead of the capacitors. Similarly a variable length transmission line in arm C may be automatically adjusted if a standard line is used in arm A. Variable resistors may also be adjusted to equal a standard if the standard is inserted in arm B, the variable in arm D (with shaft 108 connected thereto), and like reactances are inserted in arms A and C.

The bridge circuit embodiment of the invention may also be adapted to automatically measure the value of a reactance in the following manner. A standard (fixed) reactance $X_a$ is inserted in arm A, a fixed resistance, $R_b$, in arm B, the unknown reactance $X_c$, in arm C, and a calibrated variable resistor, $R_d$, in arm D, with shaft 108 attached thereto. Even though the reactance of arm A is not equal to that of arm C, and the resistance of arm B is not equal to arm D, it will be apparent to those skilled in the art that shaft 108 will still be able to automatically adjust $R_d$ to a value such that the signals at points 12 and 16 will attain phase coincidence. The only requirement is that $X_a$ and $X_c$ be of the same order of magnitude. Proper calibration of the angular position of $R_d$ in units of reactance for automatic indicating purposes can be readily made by those conversant with the electrical measuring art.

In all of the above-discussed embodiments of the invention the initial angular orientation of motor 100 is immaterial. Thus motor 100 may be hand held in any position to effect an adjusting operation.

The instant invention is not limited to the specificities of the foregoing description since many modifications thereof which still fall within the true scope of the inventive concept will be apparent to those conversant with the art. The invention is defined only by the appended claims.

I claim:

1. A phase coincidence detector for (1) providing an output signal at one lead when two periodic input signals attain phase coincidence, and (2) providing an output signal at another lead when the phase of a predetermined one of said input signals leads the other, comprising:

(a) means for deriving respective pulse trains from said input signals, said pulse trains having the same relative phases as said input signals, (b) two pulse lengtheners coupled to said means of clause (a) for deriving lengthened pulses from said pulse trains,
(c) means, responsive to said lengthened pulses, and having two output leads, for providing simultaneous pulses on said two output leads when said lengthened pulses are in phase coincidence, and for providing pulses on a predetermined one only of said output leads when said predetermined one of said input signals leads the other, and
(d) an AND gate having two inputs connected to said two output leads whereby said AND gate will provide an output only when said input signals are in phase coincidence.

2. The detector of claim 1 wherein each of said input signals are substantially sinusoidal and said means of clause (a) comprises means for successively limiting said input signals, differentiating the resultant limited signals, and clipping one polarity from each of the resultant differentiated signals.

3. The detector of claim 1 wherein said pulse lengtheners are monostable multivibrators and said means of clause (c) comprises two normally transmissive controllable gates.

4. A phase detector for providing a first indication when two pulse trains are in phase and a second indication if the phase of a first of said pulse trains leads the phase of a second of said pulse trains, comprising:
(a) first means for supplying said first pulse train at a first terminal and said second pulse train at a second terminal,
(b) second means, connected to said first terminal and responsive to said first pulse train, for supplying, at a first output terminal thereof, a third pulse train which consists of pulses which correspond in times of occurrence to the respective pulses in said first pulse train but which are lengthened with respect thereto, and for supplying, at a second output terminal thereof, a fourth pulse train which is delayed with respect to said third pulse train and which consists of pulses which also correspond in time of occurrence except for said delay to the respective pulses in said first pulse train, but which are lengthened with respect thereto,
(c) third means, similar to said second means, connected to said second terminal and responsive to said second pulse train, for supplying fifth and sixth pulse trains similar to said third and fourth pulse trains, respectively,
(d) first and second normally transmissive controllable gates, each having a signal input, a signal output, and an inhibit input, the signal input of the first gate connected to the first output of said third means and the signal input of the second gate connected to the first output of said fourth means, the inhibit input of the first gate connected to the second output of said third means and the inhibit input of the second gate connected to the second output of said second means, and
(e) an AND gate having first and second inputs and an output, said first input of said AND gate connected to the output of said first controllable gate and said second input of said AND gate connected to the output of said second controllable gate, whereby the presence of a signal at the output of said AND gate indicates that said pulse trains are in phase and the presence of a signal at the output of said first controllable gate indicates that said first pulse train leads said second pulse train.

5. The phase detector of claim 4 wherein said second and third means each comprises a monostable multivibrator, each multivibrator comprising two cross-coupled inverters, the output of each inverter constituting a separate output terminal of its respective means.

6. The phase detector of claim 4 wherein said second and third means each include a pulse delayer connecting said first output to said second output of each means.

7. Apparatus for automatically adjusting a variable phase shifting means having a rotatable control so that said means produces no phase shift of an applied signal, comprising:
(a) a source of an alternating current signal,
(b) variable phase shifting first means, connected to said source and having an output terminal and a rotatable control, for variably shifting the phase of said signal according to the position of said rotatable control,
(c) second means, connected to said signal source and said output terminal of said first means, for supplying a predetermined output signal only when said alternating signal and the variably phase-shifted signal provided by said first means are in phase,
(d) a source of electrical energy,
(e) third means, responsive to said source of electrical energy, for continuously rotating said control of said first means, and
(f) fourth means coupled to said alternating current source, said second means, and said third means for terminating the supply of electrical energy from said source thereof to said third means in response to said predetermined output signal from said second means, whereby said third means will automatically adjust said first means to produce no phase shift of said applied alternating signal.

8. The apparatus of claim 7 wherein said first means comprises an inductive reactance and a capacitive reactance connected to said inductive reactance and wherein said rotatable control is connected to change the value of one of said reactances.

9. The apparatus of claim 7 wherein said first means comprises two reactances and two resistances connected in a series loop to form a bridge circuit and wherein adjustment of said rotatable control will change the value of one of said reactances.

10. Apparatus for automatically adjusting a variable phase shifting means having a rotatable control so that said means produces no phase shift of an applied signal, said apparatus comprising:
(a) a source of an alternating current signal,
(b) variable phase shifting first means, connected to said source and having an output terminal and a rotatable control, for variably shifting the phase of said signal according to the position of said rotatable control,
(c) second means, connected to said signal source and said output terminal of said first means, for providing one predetermined output on one lead only when said alternating current signal and the variably phase-shifted signal provided by said first means are in phase, and for providing another predetermined output on another lead only when the phase of a predetermined one of said signals leads the phase of the other,
(d) a source of electrical energy,
(e) third means, responsive to said source of electrical energy, for continuously rotating said control of said first means in a predetermined direction, and responsive to said source and said other predetermined output of said second means for continuously rotating said control in a direction opposite to said predetermined direction, and
(f) means for terminating the supply of electrical energy from said source thereof to said third means in response to said one predetermined output from said second means, whereby said third means will automatically adjust said first means to produce no phase shift of said alternating signal.

11. Apparatus for automatically adjusting a rotatable frequency adjusting control of a variable frequency signal generator to provide a signal of a predetermined frequency, comprising:

(a) first means connected to said generator for deriving from the output signal thereof a second signal of the same frequency as said output signal but which differs in phase from said output signal when the frequency of said output signal differs from said predetermined frequency, (b) second means, responsive to said output signal and said second signal, for providing one predetermined output only when said signals are in phase, (c) a source of electrical energy, (d) third means responsive to said source of electrical energy for continuously rotating said control of said generator, and (e) fourth means for terminating the supply of electrical energy from said source thereof to said third means in response to said output from said second means, whereby said third means will automatically adjust the control of said generator so that said generator will supply an output signal of said predetermined frequency.

12. The apparatus of claim 11 wherein said second means is also responsive to said output signal and said second signal for providing a second output of a predetermined form only when a predetermined one of said signals leads the other, and wherein said third means functions normally to rotate said control in a predetermined direction, but responds to said second output to rotate said control in a direction opposite to said predetermined direction.

13. Automatic adjusting apparatus, comprising (a) a source of an alternating voltage, (b) a phase shifting bridge circuit having four impedances, A, B, D, and C, connected in a ring in the order recited, impedances A and C being reactive and impedances B and D being resistive, said source being connected to the junction of impedances A and C, the junction of impedances B and D being connected to a point at reference potential with respect to said source, (c) phase comparator means responsive to a first signal at the junction of impedances A and B and to a second signal at the junction of impedances C and D for providing a third signal if said first and second signals are in phase and a fourth signal if a predetermined one of said first and second signals leads the other, and (d) means (1) for continuously adjusting the value of one of said impedances in a direction so as to cause said predetermined one of said first and second signals to advance in phase with respect to the other of said first and second signals, (2) for reversing the direction of adjustment of said one of said impedances in response to the appearance of said fourth signal; and (3) for terminating adjustment in response to the appearance of said third output signal.

References Cited by the Examiner

UNITED STATES PATENTS

| | | | |
|---|---|---|---|
| 2,476,496 | 7/1949 | Kliever | 324—57.2 |
| 2,774,872 | 12/1956 | Howson. | |
| 2,892,945 | 5/1959 | Ule | 331—18 X |
| 2,906,956 | 9/1959 | Masonson | 324—83 |

WALTER L. CARLSON, *Primary Examiner.*

P. F. WILLE, *Assistant Examiner.*